(12) United States Patent
Wang et al.

(10) Patent No.: US 12,108,065 B2
(45) Date of Patent: Oct. 1, 2024

(54) ENCODING METHOD AND APPARATUS FOR SCREEN SHARING, STORAGE MEDIUM, AND ELECTRONIC DEVICE

(71) Applicant: TENCENT TECHNOLOGY (SHENZHEN) COMPANY LIMITED, Guangdong (CN)

(72) Inventors: Shitao Wang, Shenzhen (CN); Shan Liu, Shenzhen (CN); Haijun Liu, Shenzhen (CN); Qing Zhang, Shenzhen (CN); Jing Guo, Shenzhen (CN); Feijian Jin, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 132 days.

(21) Appl. No.: 17/509,687

(22) Filed: Oct. 25, 2021

(65) Prior Publication Data

US 2022/0046261 A1 Feb. 10, 2022

Related U.S. Application Data

(63) Continuation of application No. PCT/CN2020/104476, filed on Jul. 24, 2020.

(30) Foreign Application Priority Data

Oct. 8, 2019 (CN) .......................... 201910949897.5

(51) Int. Cl.
*H01L 29/94* (2006.01)
*H04N 19/124* (2014.01)
(Continued)

(52) U.S. Cl.
CPC .......... *H04N 19/44* (2014.11); *H04N 19/124* (2014.11); *H04N 19/134* (2014.11); *H04N 19/59* (2014.11)

(58) Field of Classification Search
CPC .... H04N 19/44; H04N 19/124; H04N 19/134; H04N 19/59; H04N 19/103; H04N 19/14;
(Continued)

(56) References Cited

U.S. PATENT DOCUMENTS 5,038,209 A * 8/1991 Hang ..................... H04N 19/60
375/E7.218
7,051,126 B1 * 5/2006 Franklin ............. H03M 7/3084
710/68

(Continued)

FOREIGN PATENT DOCUMENTS

CN 102202224 A 9/2011
CN 102883134 A 1/2013
(Continued)

OTHER PUBLICATIONS

International Search Report for PCT/CN2020/104476 dated Oct. 15, 2020 (PCT/ISA/210).
(Continued)

*Primary Examiner* — Joseph Suh
(74) *Attorney, Agent, or Firm* — Sughrue Mion, PLLC

(57) ABSTRACT

An encoding method includes capturing an original screen video to be encoded, the original screen video including frames of screen images, reading image feature parameters of the frames of screen images in the original screen video, determining video encoding parameters for the original screen video according to the image feature parameters, acquiring a screen display resolution of a screen sharing object, and encoding the original screen video according to the video encoding parameters and with reference to the screen display resolution of the screen sharing object.

11 Claims, 6 Drawing Sheets

(51) Int. Cl.
*H04N 19/134* (2014.01)
*H04N 19/44* (2014.01)
*H04N 19/59* (2014.01)

(58) Field of Classification Search
CPC ............... H04N 19/156; H04N 19/172; H04N 21/44008; H04N 19/137; H04N 19/146; H04N 19/20; H04N 21/4402; H04N 21/440281

See application file for complete search history.

(56) References Cited

U.S. PATENT DOCUMENTS

| | | | | |
|---|---|---|---|---|
| 8,224,885 | B1* | 7/2012 | Doucette | G06F 9/00 709/201 |
| 9,143,731 | B2* | 9/2015 | Gordon | H04N 21/4621 |
| 10,593,019 | B2* | 3/2020 | Jain | H04N 19/50 |
| 10,594,333 | B1* | 3/2020 | Choo | H04N 25/75 |
| 2002/0126752 | A1* | 9/2002 | Kim | H04N 19/40 375/240.03 |
| 2006/0079214 | A1* | 4/2006 | Mertama | H04M 1/72412 455/418 |
| 2008/0278595 | A1* | 11/2008 | Schmit | H04N 19/132 348/222.1 |
| 2008/0291995 | A1* | 11/2008 | Graham | H04N 19/156 375/E7.137 |
| 2009/0305680 | A1* | 12/2009 | Swift | H04L 43/00 455/414.1 |
| 2010/0033302 | A1* | 2/2010 | Yamamoto | G06V 40/10 340/5.82 |
| 2011/0203006 | A1* | 8/2011 | Gopalakrishnan | H04W 4/18 709/217 |
| 2013/0034146 | A1* | 2/2013 | Jeong | H04N 19/103 375/E7.026 |
| 2013/0058232 | A1* | 3/2013 | Wurm | H04N 19/164 370/252 |
| 2014/0118222 | A1* | 5/2014 | Barrett | G01C 21/3688 345/2.2 |
| 2014/0140682 | A1* | 5/2014 | Wang | G11B 20/00884 386/260 |
| 2015/0029196 | A1* | 1/2015 | Shida | G06T 11/203 345/443 |
| 2015/0131748 | A1* | 5/2015 | Ono | H04N 19/85 375/240.08 |
| 2015/0201193 | A1* | 7/2015 | Gu | H04N 19/115 375/E7.026 |
| 2016/0212373 | A1* | 7/2016 | Aharon | H04N 19/513 |
| 2018/0167673 | A1* | 6/2018 | Deen | H04N 21/47217 |
| 2018/0288417 | A1* | 10/2018 | Jung | H04N 19/132 |
| 2018/0373546 | A1* | 12/2018 | Abiezzi | G06T 9/00 |
| 2019/0082231 | A1* | 3/2019 | Chen | H04N 21/44008 |
| 2019/0104306 | A1* | 4/2019 | Wang | H04N 21/234309 |
| 2019/0110087 | A1* | 4/2019 | Parasseeri | H04N 21/21805 |
| 2019/0197350 | A1* | 6/2019 | Park | G06T 7/254 |
| 2020/0228706 | A1* | 7/2020 | Park | H04N 23/73 |

FOREIGN PATENT DOCUMENTS

| | | |
|---|---|---|
| CN | 103248947 A | 8/2013 |
| CN | 106528021 A | 3/2017 |
| CN | 108924611 A | 11/2018 |
| CN | 109325518 A | 2/2019 |
| CN | 110248192 A | 9/2019 |
| CN | 111182303 A | 5/2020 |
| CN | 102625106 A | 8/2021 |
| JP | 2007117433 A * | 5/2007 |
| JP | 2008142150 A * | 6/2008 |

OTHER PUBLICATIONS

Written Opinion of the International Searching Authority for PCT/CN2020/104476 dated Oct. 15, 2020 (PCT/ISA/237).

* cited by examiner

ENCODING METHOD AND APPARATUS FOR SCREEN SHARING, STORAGE MEDIUM, AND ELECTRONIC DEVICE

CROSS-REFERENCE TO RELATED APPLICATION(S)

This application is a continuation application of International Application No. PCT/CN2020/104476, filed on Jul. 24, 2020, which claims priority to Chinese Patent Application No. 201910949897.5, filed with the China National Intellectual Property Administration on Oct. 8, 2019, the disclosures of which are incorporated by reference in their entireties.

FIELD

The disclosure relates to the field of computer and communication technologies, and specifically, to an encoding method and apparatus for screen sharing, a storage medium, and an electronic device.

BACKGROUND

In scenes of encoding for screen sharing such as meeting screen sharing and wireless projection, a captured original screen video is generally encoded according to fixed resolution, a fixed encoding frame rate, and other fixed parameters. Finally, encoded screen content is shared with another screen. However, an urgent technical problem to be solved is to improve efficiency of encoding for sharing screen.

SUMMARY

Embodiments of the disclosure may provide an encoding method and apparatus for screen sharing, a storage medium, and an electronic device, which can improve the efficiency of encoding for screen sharing.

Other features and advantages of the disclosure become obvious through the following detailed description, or may be partially learned through the practice of the disclosure.

According to an aspect, an example embodiment of the disclosure may provide an encoding method for screen sharing applicable to an electronic device. The method includes:

capturing an original screen video to be encoded, the original screen video including a plurality of frames of screen images;

reading image feature parameters of the plurality of frames of screen images in the original screen video;

determining video encoding parameters for the original screen video according to the image feature parameters;

acquiring screen display resolution of a screen sharing object; and encoding the original screen video according to the video encoding parameters and with reference to the screen display resolution of the screen sharing object.

According to an aspect, an example embodiment of the disclosure may provide an encoding apparatus for screen sharing. The apparatus includes:

a capturing unit, configured to capture an original screen video to be encoded, the original screen video including a plurality of frames of screen images;

a reading unit, configured to read image feature parameters of the plurality of frames of screen images in the original screen video, and determine video encoding parameters for the original screen video according to the image feature parameters;

an acquiring unit, configured to acquire screen display resolution of a screen sharing object; and an encoding unit, configured to encode the original screen video according to the video encoding parameters and with reference to the screen display resolution of the screen sharing object.

In an example embodiment of the disclosure, based on the foregoing solution, the reading unit may be configured to: read the image feature parameters of the plurality of frames of screen images in the original screen video, which specifically includes at least one of the following: reading image fingerprint strings of the plurality of frames of screen images in the original screen video; reading image vector eigenvalues of the plurality of frames of screen images in the original screen video; reading image color histograms of the plurality of frames of screen images in the original screen video; reading image pixel grayscale values of the plurality of frames of screen images in the original screen video; and reading image complexities of the plurality of frames of screen images in the original screen video.

In an example embodiment of the disclosure, based on the foregoing solution, the image feature parameters may include the image fingerprint strings. The reading unit includes: a calculating unit, configured to calculate, based on the image fingerprint strings, similarities between adjacent frames of images in the plurality of frames of screen images in the original screen video; and a first determining unit, configured to determine, according to the similarities between the adjacent frames of images, an encoding frame rate for performing video encoding on the original screen video.

In an example embodiment of the disclosure, based on the foregoing solution, the first determining unit may be configured to: detect whether the similarities between the adjacent frames of images are greater than a predetermined threshold; and determine the encoding frame rate for performing video encoding on the original screen video as 0, in a case that the similarities between the adjacent frames of images are greater than the predetermined threshold.

In an example embodiment of the disclosure, based on the foregoing solution, the image feature parameters may include the image complexities. The reading unit includes: a second determining unit, configured to determine, based on an image complexity of a current frame of screen image, a quantization parameter (QP) for performing video encoding on the original screen video.

In an example embodiment of the disclosure, based on the foregoing solution, the second determining unit may be configured to: detect whether the image complexity of the screen image is greater or less than an image complexity of a previous frame of screen image; and correspondingly increase or decrease the QP for performing video encoding on the original screen video, in a case that the image complexity of the screen image is greater or less than the image complexity of the previous frame of screen image.

In an example embodiment of the disclosure, based on the foregoing solution, the acquiring unit may be configured to: acquire video capture resolution of the original screen video before encoding the original screen video. The encoding unit is configured to: detect whether the video capture resolution is greater than the screen display resolution; and encode the original screen video according to the video encoding parameters by using the screen display resolution as a standard in a case that the video capture resolution is greater than the screen display resolution.

In an example embodiment of the disclosure, based on the foregoing solution, the encoding unit may be configured to: record an encoding time for each frame of screen image in the original screen video during encoding of the original screen video; calculate an average encoding time of first N frames of screen images, where N is an integer greater than 0; determine an encoding mode based on the average encoding time of the first N frames of screen images; and encode the original screen video based on the encoding mode and according to the video encoding parameters.

In an example embodiment of the disclosure, based on the foregoing solution, the encoding unit may be configured to: detect whether the average encoding time of the first N frames of screen images is greater than a predetermined threshold; use hardware encoding as the determined encoding mode, in a case that the average encoding time of the first N frames of screen images is greater than a time threshold; and use software encoding as the determined encoding mode, in a case that the average encoding time of the first N frames of screen images is not greater than the time threshold.

According to an aspect, an example embodiment of the disclosure may provide a computer-readable storage medium storing a computer program, the computer program, when being executed by a processor, causes the processor to perform the encoding method for screen sharing according to the foregoing embodiments.

According to an aspect, an example embodiment of the disclosure may provide an electronic device, including: one or more processors; and a storage apparatus, configured to store one or more programs, the one or more programs, when being executed by the one or more processors, causing the one or more processors to perform the encoding method for screen sharing as described in the foregoing embodiments.

In the technical solution provided in some embodiments of the disclosure, the video encoding parameters for the original screen video is determined according to the read image feature parameters of the plurality of frames of screen images in the original screen video. Then, the screen display resolution of the screen sharing object is acquired. The original screen video is encoded with reference to the screen display resolution of the screen sharing object and the video encoding parameters. In the embodiments of the disclosure, image features of the screen images and the screen display resolution of the screen sharing object during encoding of the original screen video are taken into account. Therefore, encoding parameters suitable for an actual situation of the original screen video can be determined. In this way, the original screen video can be effectively encoded, thereby resolving the technical problem that the related art fails to improve the efficiency of encoding for screen sharing.

It is to be understood that, the foregoing general descriptions and the following detailed descriptions are merely for illustration and explanation purposes and are not intended to limit the disclosure.

BRIEF DESCRIPTION OF THE DRAWINGS

To describe the technical solutions of example embodiments of this disclosure more clearly, the following briefly introduces the accompanying drawings for describing the example embodiments. The accompanying drawings herein are incorporated into the specification and constitute a part of this specification, show embodiments that conform to the disclosure, and are used for describing a principle of the disclosure together with this specification. The accompanying drawings described below are merely some embodiments of the disclosure, and a person of ordinary skill in the art may further obtain other accompanying drawings according to the accompanying drawings without creative efforts. In addition, one of ordinary skill would understand that aspects of example embodiments may be combined together or implemented alone. In the accompanying drawings.

DESCRIPTION OF EMBODIMENTS

Example embodiments will now be described more thoroughly with reference to the accompanying drawings. However, the example embodiments may be implemented in various forms, and are not to be understood as being limited to the examples described herein. Instead, the example embodiments are provided to make the disclosure more thorough and complete and fully convey the idea of the example embodiments to a person skilled in the art.

In addition, the described features, structures or characteristics may be combined in one or more embodiments in any appropriate manner. In the following descriptions, a lot of specific details are provided to give a comprehensive understanding of the embodiments of the disclosure. However, a person of ordinary skill in the art is to be aware that, the technical solutions in the disclosure may be implemented without one or more of the particular details, or another method, unit, apparatus, or step may be used. In other cases, well-known methods, apparatuses, implementations, or operations are not shown or described in detail, in order not to obscure the aspects of the disclosure.

The block diagrams shown in the accompanying drawings are merely functional entities and do not necessarily correspond to physically independent entities. That is, the functional entities may be implemented in a software form, or in one or more hardware modules or integrated circuits, or in different networks and/or processor apparatuses and/or microcontroller apparatuses.

The flowcharts shown in the accompanying drawings are merely exemplary descriptions, do not need to include all content and operations/steps, and do not need to be performed in the described orders either. For example, some operations/steps may be further divided, while some operations/steps may be combined or partially combined. Therefore, an actual execution order may change according to an actual case.

Figure 1:
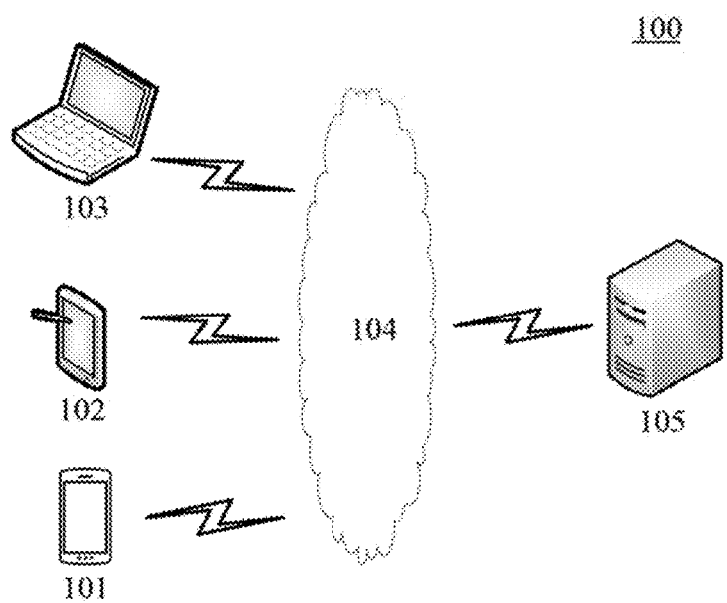
FIG. 1 shows a schematic diagram of an exemplary system architecture to which a technical solution according to an example embodiment of the disclosure is applicable.

FIG. 1 is a schematic diagram of an exemplary system architecture to which a technical solution according to an example embodiment of the disclosure is applicable.

As shown in FIG. 1, the system architecture may include a terminal device (which may be any one or more of a smart phone 101, a tablet computer 102, and a portable computer 103 shown in FIG. 1, or certainly may be a desktop computer, and the like), a network 104, and a server 105. The network 104 is configured to provide a medium of communication link between the terminal device and the server 105. The network 104 may include various connection types, for example, a wired communication link, a wireless communication link, and the like.

It is to be understood that the quantities of terminal devices, networks, and servers in FIG. 1 are merely exemplary. There may be any quantities of terminal devices, networks, and servers according to an implementation requirement. For example, the server 105 may be a server cluster including a plurality of servers.

In an example embodiment of the disclosure, a user may use the terminal device to upload an original screen video for screen sharing (for example, a screen video of the user presenting a PowerPoint (PPT) document on a computer desktop for teaching or holding a meeting) to the server 105. After capturing the original screen video uploaded by the terminal device, the server 105 may encode the original screen video.

In an example embodiment of the disclosure, during encoding of the original screen video, the server 105 may: determine video encoding parameters for the original screen video according to read image feature parameters of a plurality of frames of screen images in the original screen video; then, acquire screen display resolution of a screen sharing object; and encode the original screen video with reference to the screen display resolution of the screen sharing object and the video encoding parameters.

An encoding method for screen sharing provided in the embodiments of the disclosure is generally performed by the server 105. Correspondingly, an encoding apparatus for screen sharing is generally provided in the server 105. However, in some other embodiments of the disclosure, the terminal device may alternatively have functions similar to those of the server, so as to perform the encoding solution for screen sharing provided in the embodiments of the disclosure.

Specifically, screen sharing is herein explained. In the disclosure, the screen sharing refers to sharing original display content on a screen with another as exactly the content is. There are two types of screen sharing. One type is sharing with a control right, which may also be referred to as remote assistance. That is, in a case that there is a problem with one party's computer, screen sharing for the one party to request another party to remotely assist with solving the problem. The requested party owns the control right over the requesting party's computer. The other type is simply screen sharing. That is, only sharing screen content with another. For example, a screen sharing function in QQ. Content on a user's screen is shared with another party, in a case that the another party sends a sharing request through QQ, or the user invites the another party to share the screen.

Figure 2:
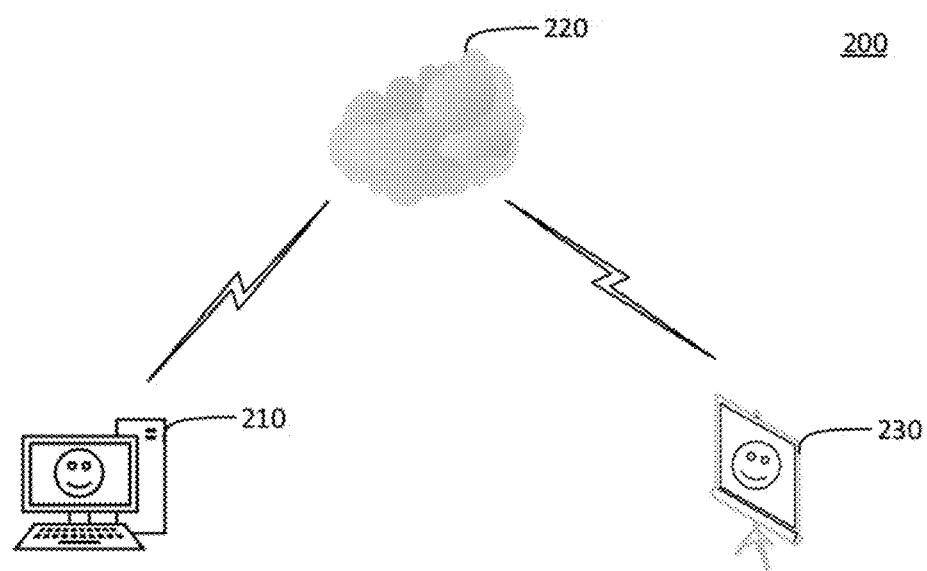
FIG. 2 shows a diagram of an application scene of realizing screen sharing according to an example embodiment of the disclosure.

FIG. 2 shows a diagram of an application scene of realizing screen sharing according to an embodiment of the disclosure.

In an example embodiment of the disclosure, as shown in FIG. 2, the application scene of the technical solution in the disclosure may be sharing screen content (a screen video) on a display screen 210 at a computer side to another display screen 230. Specifically, before sharing the screen content on the display screen 210 to the display screen 230, the shared screen content needs to be encoded. A subject performing encoding may be a host at the computer side or a cloud server 220 as shown in the figure.

The implementation details of the technical solution in the embodiments of the disclosure are described below in detail.

Figure 3:
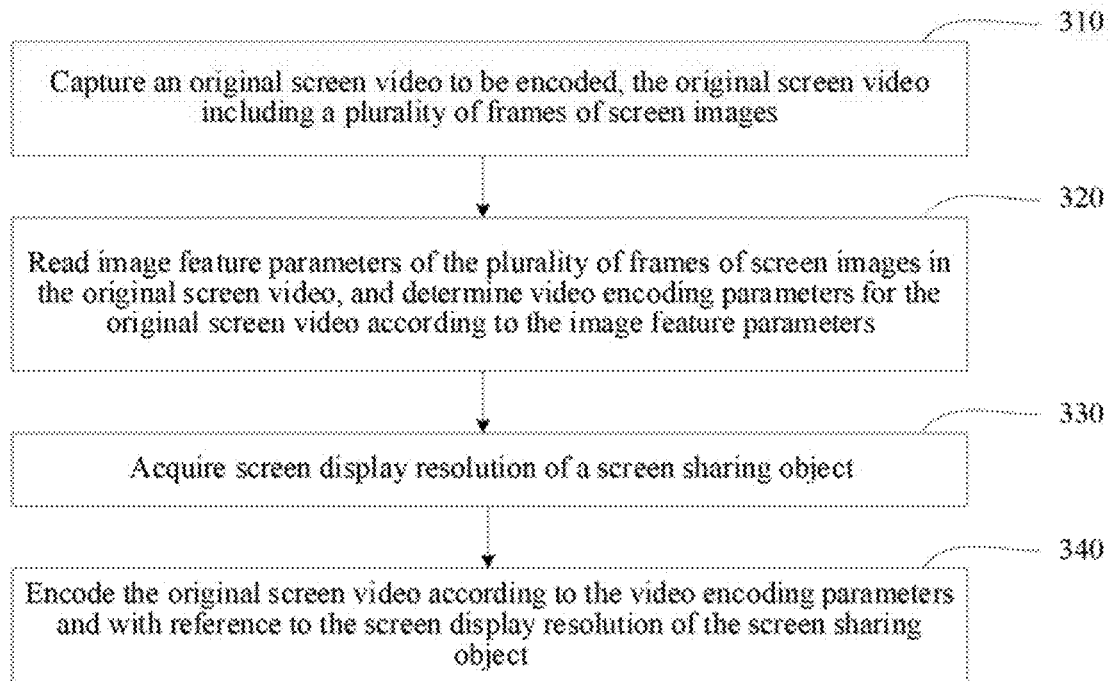
FIG. 3 shows a flowchart of an encoding method for screen sharing according to an example embodiment of the disclosure.

Referring to FIG. 3, FIG. 3 shows a flowchart of an encoding method for screen sharing according to an example embodiment of the disclosure. The encoding method for screen sharing may be performed by a device with computing and processing functions, for example, the server 105 or the terminal device as shown in FIG. 1. As shown in FIG. 3, the encoding method for screen sharing may include operations 310 to 340:

Operation 310: Capture an original screen video to be encoded, the original screen video including a plurality of frames of screen images.

Operation 320: Read image feature parameters of the plurality of frames of screen images in the original screen video, and determine video encoding parameters for the original screen video according to the image feature parameters.

Operation 330: Acquire screen display resolution of a screen sharing object.

Operation 340: Encode the original screen video according to the video encoding parameters and with reference to the screen display resolution of the screen sharing object.

The above implementation operations will be described in detail below.

In operation 310, the original screen video to be encoded is captured. The original screen video includes the plurality of frames of screen images.

The original screen video to be encoded may be captured by a specific screen recording device or screen recording software installed at a screen sharing side. The captured screen video may be a set including the plurality of frames of screen images. Each frame of screen image in the set may be an image of a display screen captured by the screen recording device or the screen recording software at each time point.

The screen recording device or the screen recording software may capture the display screen according to a fixed length of time. That is, one screen image is captured every fixed time interval. A length of the fixed time interval is arbitrary. A larger fixed time interval indicates less screen images captured per unit time, while a smaller fixed time interval indicates more screen images captured per unit time.

In operation 320, the image feature parameters of the plurality of frames of screen images in the original screen video are read, and the video encoding parameters for the original screen video are determined according to the image feature parameters.

In an example embodiment of the disclosure, the reading image feature parameters of the plurality of frames of screen images in the original screen video may specifically include at least one of the following:

The first way is to read image fingerprint strings of the plurality of frames of screen images in the original screen video.

An image fingerprint string refers to a corresponding fingerprint information sequence generated for an image according to a certain rule by using a perceptual hash algorithm.

Specifically, a fingerprint string of an image may be generated through the following operations:

Operation 1: Input a target image.
Operation 2: Grayscale the target image.
Operation 3: Normalize a grayscaled target image to a size of n*n.
Operation 4: Simplify grayscales to reduce a calculation amount. For example, all gray scales are divided by 5.
Operation 5: Calculate an average grayscale value.
Operation 6: Compare a grayscale value of each pixel in n*n pixels with the average grayscale value. A pixel with a grayscale value greater than the average grayscale value is recorded as 1. A pixel with a grayscale value less than the average grayscale value is recorded as 0. An n*n-bit binary fingerprint code is arranged in a certain order. The fingerprint code is the fingerprint string of the image.

The second way is to read image vector eigenvalues of the plurality of frames of screen images in the original screen video.

Essentially, a digital image includes a plurality of pixels, and each pixel may be represented by a pixel value. Therefore, pixel values of the entire image may be represented by a matrix including a plurality of eigenvalues. An image vector eigenvalue may be acquired by processing the matrix.

The third way is to read image color histograms of the plurality of frames of screen images in the original screen video.

A color histogram is a histogram generated according to a color distribution in an image, which is used for showing color distribution condition.

The fourth way is to read image pixel grayscale values of the plurality of frames of screen images in the original screen video.

The fifth way is to read image complexities of the plurality of frames of screen images in the original screen video.

An image complexity is mainly used for describing a complexity degree of an image, which may be acquired by a pre-encoding module according to intra-frame prediction and inter-frame prediction of the image. The intra-frame prediction, by taking advantage of a correlation of a video space domain, predicts a current pixel using an adjacent encoded pixel in the same frame of image. The inter-frame prediction uses pixels of a previous encoded image to predict pixels of a current frame of image.

In an example embodiment of the disclosure, the image feature parameters include the image fingerprint strings. The video encoding parameters for the original screen video may be determined through the operations in FIG. 4.

Figure 4:
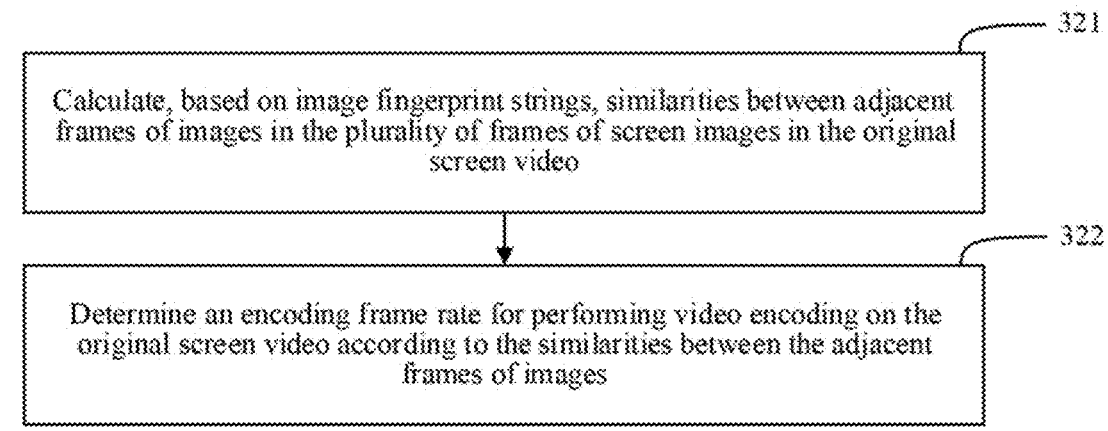
FIG. 4 shows a detailed flowchart of determining video encoding parameters for an original screen video according to an example embodiment of the disclosure.

FIG. 4 shows a detailed flowchart of determining video encoding parameters for an original screen video according to an embodiment of the disclosure. Specifically, operations 321 to 322 are included:

Operation 321: Calculate, based on the image fingerprint strings, similarities between adjacent frames of images in the plurality of frames of screen images in the original screen video.

An image fingerprint string refers to a corresponding fingerprint information sequence generated for an image according to a certain rule by using a perceptual hash algorithm.

In a specific implementation of an example embodiment, to make those skilled in the art more intuitively understand the way to calculate the similarities between adjacent frames of images, a specific example is provided for explanation below.

For example, a fingerprint string of an image A is 01101101110, and a fingerprint string of an image B is 00100111110. By comparing the fingerprint strings of the image A and the image B, it is found that the fingerprint strings of the image A and the image B are different at the second character, the fifth character, and the seventh character. In a total, three characters are different, and seven characters are the same. That is, a similarity between the image A and the image B is 70%.

Operation 322: Determine, according to the similarities between the adjacent frames of images, an encoding frame rate for performing video encoding on the original screen video.

Specifically, a frame rate refers to a quantity of frames of images played within one second.

Figure 5:
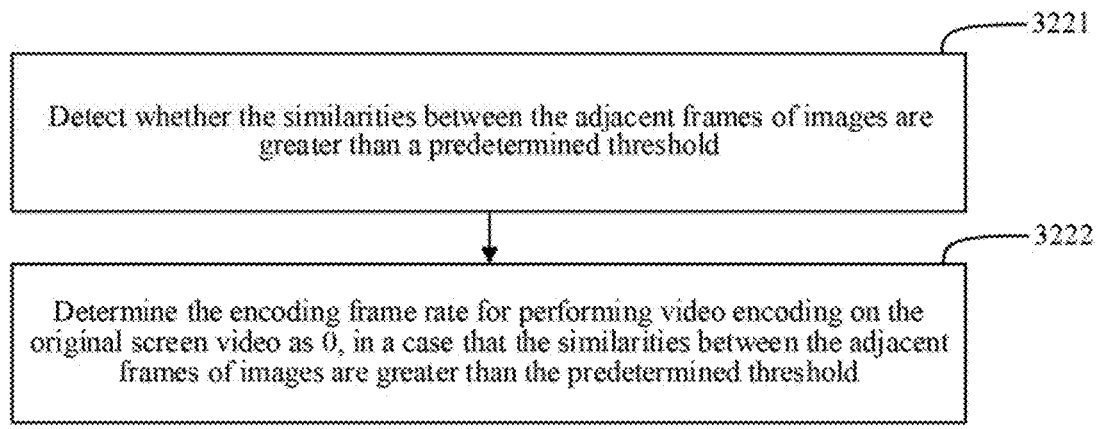
FIG. 5 shows a detailed flowchart of determining an encoding frame rate for performing video encoding on an original screen video according to an example embodiment of the disclosure.

In a specific implementation of an example embodiment, the encoding frame rate for performing video encoding on the original screen video may be determined by the method as shown in FIG. 5.

FIG. 5 shows a detailed flowchart of determining an encoding frame rate for performing video encoding on an original screen video according to an embodiment of the disclosure. Specifically, operations 3221 to 3222 are included:

Operation 3221: Detect whether the similarities between the adjacent frames of images are greater than a predetermined threshold.

The predetermined threshold may be arbitrarily set, which may be 60%, 70%, or 90%.

Operation 3222: Determine the encoding frame rate for performing video encoding on the original screen video as 0, in a case that the similarities between the adjacent frames of images are greater than the predetermined threshold.

The similarities between the adjacent frames of images being greater than the predetermined threshold indicates that two adjacent images are similar in content, and may further indicate that little or no change occurs in screen content at this time. Therefore, the encoding frame rate for performing video encoding on the original screen video may be determined as 0. The encoding frame rate being determined as 0 essentially means not to encode the original screen video in which a current frame of image is located.

In addition, a person skilled in the art should understand that, in a case that the similarities between the adjacent frames of images are not greater than the predetermined threshold, the encoding frame rate for performing video encoding on the original screen video is determined as a value greater than 0.

In a specific implementation of an example embodiment, the encoding frame rate for performing video encoding on the original screen video may be determined in other ways.

For example, the encoding frame rate for performing video encoding on the original screen video may be determined based on an inversely proportional relationship between the encoding frame rate for performing video encoding on the original screen video and the similarities between the adjacent frames of images. Specifically, in a case that the similarities between the adjacent frames of images are 90%, the encoding frame rate for performing video encoding on the original screen video may be determined as 1 frame per second; in a case that the similarities between the adjacent frames of images are 50%, the encoding frame rate for performing video encoding on the original screen video may be determined as 10 frames per second; and in a case that the similarities between the adjacent frames of images are 20%, the encoding frame rate for performing video encoding on the original screen video may be determined as 20 frames per second.

In an embodiment of the disclosure, the image feature parameters include the image complexities. The video encoding parameters for the original screen video may be determined in the following manner: determining a QP for performing video encoding on the original screen video based on the image complexities of the screen images.

A QP is mainly used for reflecting a compression condition of (image) spatial details. Specifically, a smaller QP indicates finer quantization. As such, most of the details are preserved. Therefore, image quality is greater, and a generated bit rate is larger. In contrast, a larger QP indicates that some details are lost. Accordingly, the generated bit rate is reduced, which causes aggravated image distortion and degraded quality. In other words, the QP has an inversely proportional relationship with the bit rate. In addition, this inversely proportional relationship becomes more pronounced as complexities of the video frame image increase.

The foregoing bit rate refers to the amount of data transmitted within unit time.

Figure 6:
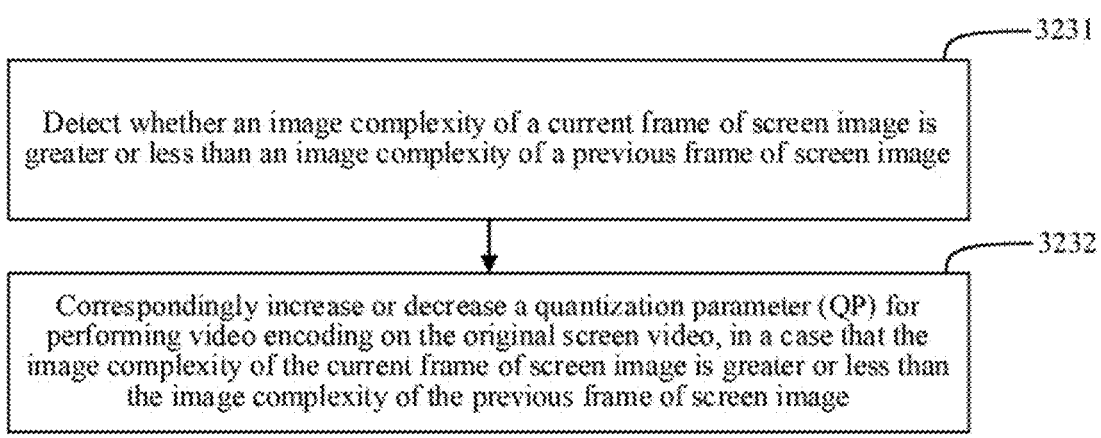
FIG. 6 shows a detailed flowchart of determining a QP for performing video encoding on an original screen video according to an example embodiment of the disclosure.

In a specific implementation of an example embodiment, the QP for performing video encoding on the original screen video may be determined by the method as shown in FIG. 6.

FIG. 6 shows a detailed flowchart of determining a QP for performing video encoding on an original screen video according to an embodiment of the disclosure. Specifically, operations 3231 to 3232 are included:

Operation 3231: Detect whether an image complexity of a current frame of screen image is greater or less than an image complexity of a previous frame of screen image.

Operation 3232: Correspondingly increase or decrease the QP for performing video encoding on the original screen video, in a case that the image complexity of the current frame of screen image is greater or less than the image complexity of the previous frame of screen image. That is, in a case that the image complexity of the current frame of screen image is greater than the image complexity of the previous frame of screen image, the QP for performing video encoding on the original screen video is increased; and in a case that the image complexity of the current frame of screen image is less than the image complexity of the previous frame of screen image, the QP for performing video encoding on the original screen video is decreased.

An instantaneous bit rate peak occurs as screen frame switches. This brings about serious instability to encoding bit rate and poses a great difficulty to bandwidth prediction and congestion control. As described above, the advantage of adjusting the QP according to the image complexities of the screen images lies in that a large fluctuation in the bit rate due to a large change in the image complexities can be prevented by adjusting the QP.

In operation 330, the screen display resolution of the screen sharing object is acquired.

The screen sharing object may be understood as a display device to display the shared screen content, such as the display screen 230 shown in FIG. 2.

The screen display resolution refers to resolution of the screen for display, that is, a quantity of pixels displayed on the screen. For example, a resolution of 160×128 means that there are 160 pixels in a horizontal direction, and there are 128 pixels in a vertical direction. In a case of the same screen size, greater resolution indicates finer and more delicate display effect.

In operation 340, the original screen video is encoded according to the video encoding parameters and with reference to the screen display resolution of the screen sharing object.

In an example embodiment of the disclosure, before encoding the original screen video, the method further includes: acquiring video capture resolution of the original screen video.

The video capture resolution refers to resolution of a video captured by a video capturing device, and specifically, to image resolution of each frame of image in the video. For example, an image resolution of 768×576 means that there are 768 pixels in the horizontal direction, and there are 576 pixels in the vertical direction.

Figure 7:
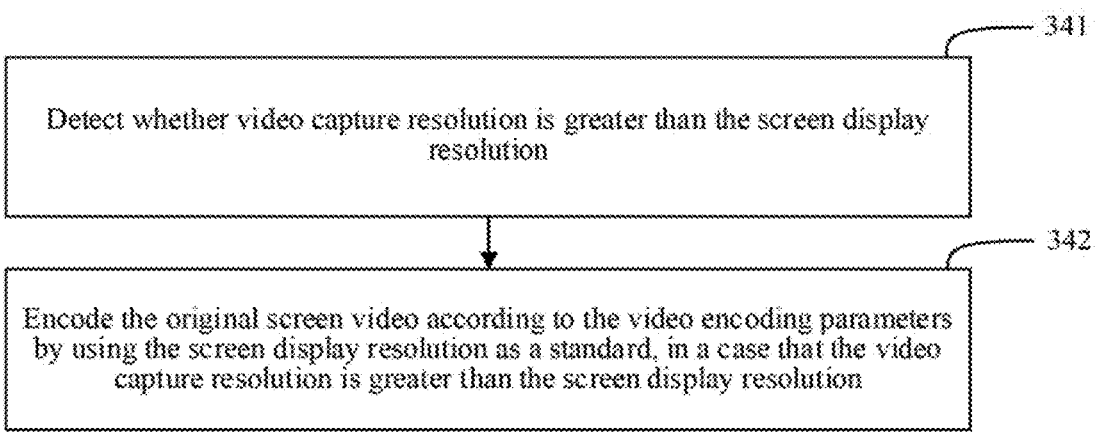
FIG. 7 shows a detailed flowchart of encoding an original screen video according to an example embodiment of the disclosure.

In addition, the original screen video may be encoded through the operations as shown in FIG. 7.

FIG. 7 shows a detailed flowchart of encoding an original screen video according to an embodiment of the disclosure. Specifically, operations 341 to 342 are included:

Operation 341: Detect whether the video capture resolution is greater than the screen display resolution.

Operation 342: Encode the original screen video according to the video encoding parameters by using the screen display resolution as a standard, in a case that the video capture resolution is greater than the screen display resolution.

Specifically, the encoding the original screen video by using the screen display resolution as a standard may be understood as to reduce resolution of the original screen video to the same resolution as the screen display resolution. This makes an encoded screen video better displayed on the display screen.

Figure 8:
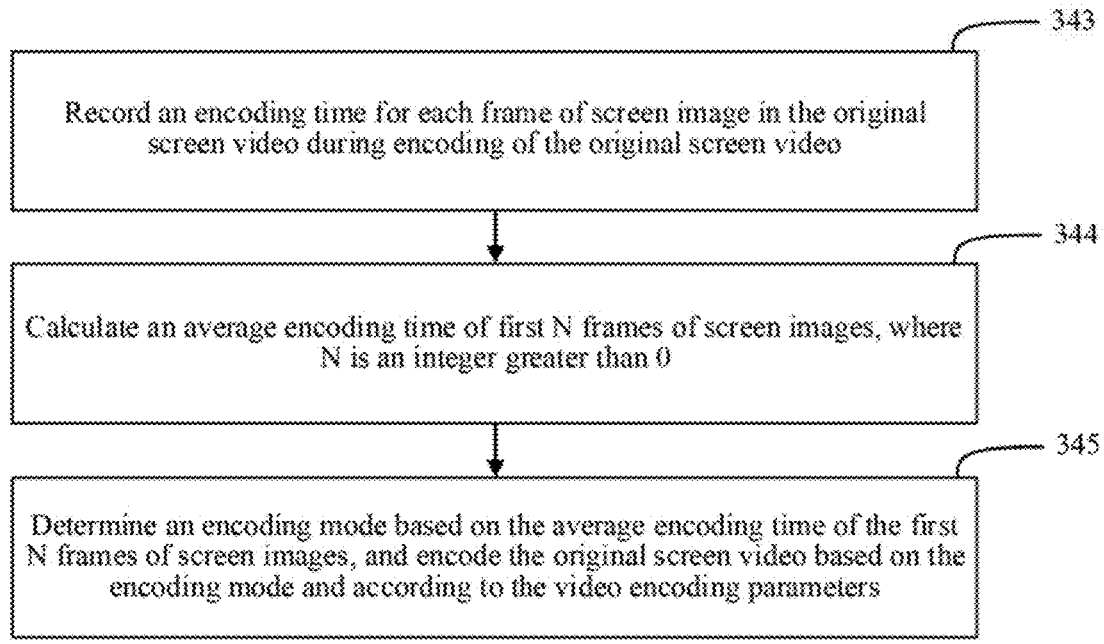
FIG. 8 shows a detailed flowchart of encoding an original screen video according to an example embodiment of the disclosure.

In an example embodiment of the disclosure, the original screen video may be encoded through the steps as shown in FIG. 8.

FIG. 8 shows a detailed flowchart of encoding an original screen video according to an embodiment of the disclosure. Specifically, operations 343 to 345 are included:

Operation 343: Record an encoding time for each frame of screen image in the original screen video during encoding of the original screen video.

Operation 344: Calculate an average encoding time of first N frames of screen images, where N is an integer greater than 0.

Operation 345: Determine an encoding mode based on the average encoding time of the first N frames of screen images, and encode the original screen video based on the encoding mode and according to the video encoding parameters.

The encoding mode may include hardware encoding and software encoding.

Figure 9:
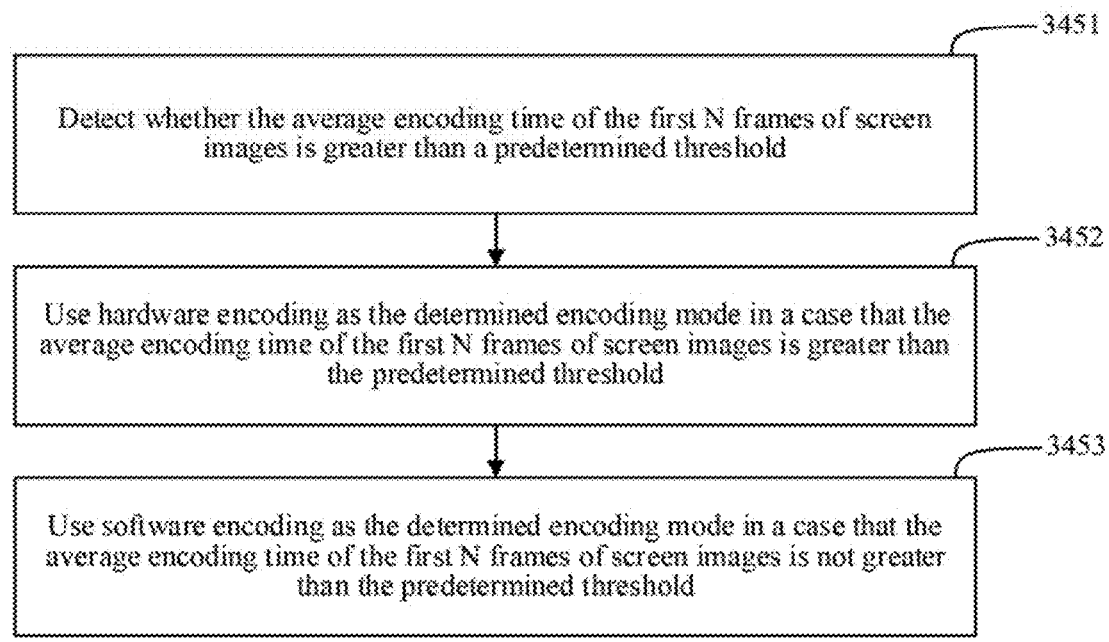
FIG. 9 shows a detailed flowchart of determining an encoding mode according to an example embodiment of the disclosure.

In a specific implementation of an embodiment, determining the encoding mode based on the average encoding time of the first N frames of screen images may be implemented by the method as shown in FIG. 9.

FIG. 9 shows a detailed flowchart of determining an encoding mode according to an embodiment of the disclosure. Specifically, operations 3451 to 3453 are included:

Operation 3451: Detect whether the average encoding time of the first N frames of screen images is greater than a predetermined threshold.

For example, an encoding time of each of first 6 frames of screen images is 0.01 second, 0.02 second, 0.01 second, 0.02 second, 0.02 second, and 0.01 second respectively. An average encoding time of the first 6 frames of screen images is (0.01 second+0.02 second+0.01 second+0.02 second+0.02 second+0.01 second)/6=0.15 second.

Operation 3452: Use the hardware encoding as the determined encoding mode, in a case that the average encoding time of the first N frames of screen images is greater than the predetermined threshold.

The hardware encoding refers to performing video encoding through hardware. The hardware encoding is performed by a graphics processing unit (GPU). Encoding by a GPU features a poor encoding quality and low time consumption.

Operation 3453: Use the software encoding as the determined encoding mode, in a case that the average encoding time of the first N frames of screen images is not greater than the predetermined threshold.

The software encoding refers to encoding by a CPU occupied by software itself. Encoding through software features a good encoding quality and high time consumption.

In order to distinguish from the predetermined threshold in operations 3221 to 3222, the predetermined threshold in operations 3451 to 3453 may be referred to as a time threshold, which is set for the average encoding time.

Figure 10:
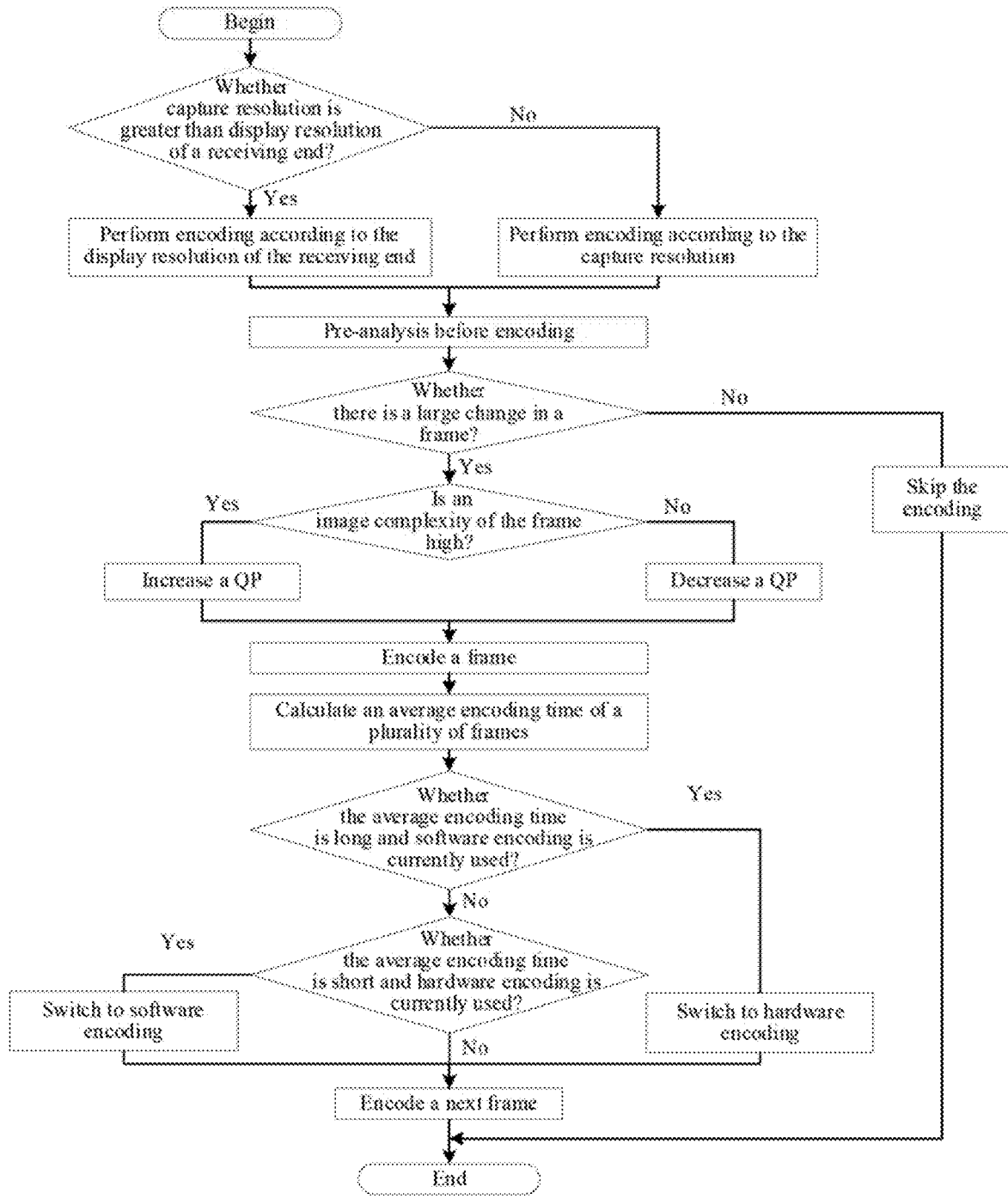
FIG. 10 shows a flowchart of encoding for screen sharing according to an example embodiment of the disclosure.

In an example embodiment of the disclosure, encoding for screen sharing may be implemented through the process shown in FIG. 10. FIG. 10 shows a flowchart of encoding for screen sharing according to an embodiment of the disclosure.

The disclosure dynamically adjusts an encoding policy in real time after screen sharing is initiated.

First, screen resolution of a receiving end may be detected. In a case that the screen resolution of the receiving end is less than capture resolution of a transmitting end, encoding is performed according to the resolution of the receiving end.

Next, whether there exists a significant change in the screen frame may be detected. For example, a screen is static most of the time for sharing documents such as a PPT. In this case, the encoding frame rate may be extremely low. However, for playing a movie and other types of scenes, a requirement for the frame rate is relatively high. The disclosure adopts a dynamic frame rate policy. In a case that the screen is static, encoding may be performed at an extremely low frame rate or even no encoding is performed; and in a case that a change is detected in images, encoding is continued.

Then, an encoding complexity of an image (that is, the foregoing image complexity) should also be detected. The encoding complexity varies with content of the screen sharing. In the disclosure, the encoding complexity of a current frame may be acquired through pre-analysis before encoding. An encoding QP of an encoder may be adjusted in advance according to the complexity, to prevent a bit rate for encoding the current frame of image from being too large or too small. In addition, the problem of a high bit rate can be resolved by adjusting the frame rate.

Finally, an average encoding time of the plurality of frames of images may be calculated. In a case of static screen sharing, such as document sharing, the encoding usually takes less time, and thus software encoding can well satisfy a performance requirement. However, in a case of movies and other types of video, encoding one frame usually takes more time. In this case, using hardware encoding can improve the encoding performance and reduce power consumption. During encoding, the disclosure dynamically switches between the software encoding and the hardware encoding in real time. In a case that the software encoding is currently used, the encoding time of a previous plurality of frames of images is calculated. In a case that an average encoding time of one frame is long over a continuous period of time (for example, being greater than 1000/frame rate millisecond (the number of milliseconds required to encode one frame)), the software encoding is switched to the hardware encoding. In a case that the hardware encoding is currently used, the encoding time of the previous plurality of frames of images is calculated. In a case that the average encoding time of one frame is short over a continuous period of time, the hardware encoding is switched to the software encoding.

The solution provided in the disclosure can significantly enhance the encoding effect for screen sharing. CPU or GPU overhead is saved by optimizing encoding resolution. In the disclosure, a pre-analysis module may be additionally provided before encoding, to reduce the encoding frame rate through a still frame detection, thereby further reducing CPU or GPU consumption and saving bandwidth. The software and hardware intelligent switching technology ensures that the high-quality software encoding is used in a scene of sharing a document such as a PPT, and the hardware encoding is used in a scene requiring a relatively high encoding complexity such as playing a video. In addition, by dynamically detecting the encoding complexity of the current frame using the pre-analysis module, the QP can be adjusted in advance, to prevent network congestion due to a sudden increase in the bit rate during encoding.

In the technical solution provided in some embodiments of the disclosure, the video encoding parameters for the original screen video are determined according to the read image feature parameters of the plurality of frames of screen images in the original screen video. Then, the screen display resolution of the screen sharing object is acquired. The original screen video is encoded with reference to the acquired screen display resolution of the screen sharing object and the determined video encoding parameters for the original screen video. In the embodiments of the disclosure, the image features of the screen images and the screen display resolution of the screen sharing object are taken into account during encoding of the original screen video. Therefore, encoding parameters suitable for an actual situation of the original screen video can be determined. In this way, the original screen video can be effectively encoded with a high quality.

The following describes apparatus embodiments of the disclosure, which can be used to perform the encoding method for screen sharing in the foregoing embodiments of the disclosure. For details not disclosed in the apparatus embodiments of the disclosure, reference may be made to the foregoing embodiments of the encoding method for screen sharing in the disclosure.

Figure 11:
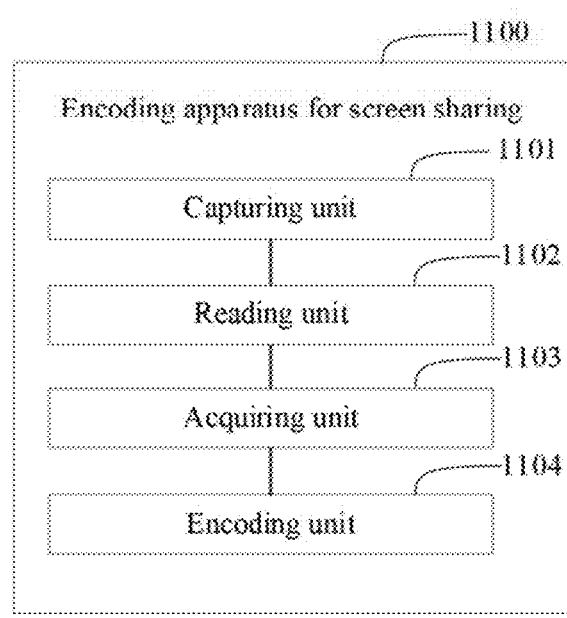
FIG. 11 shows a block diagram of an encoding apparatus for screen sharing according to an example embodiment of the disclosure.

FIG. 11 shows a block diagram of an encoding apparatus for screen sharing according to an example embodiment of the disclosure.

Referring to FIG. 11, the encoding apparatus 1100 for screen sharing according to an example embodiment of the disclosure includes: a capturing unit 1101, a reading unit 1102, an acquiring unit 1103, and an encoding unit 1104.

The capturing unit 1101 is configured to capture an original screen video to be encoded, the original screen video including a plurality of frames of screen images. The reading unit 1102 is configured to read image feature parameters of the plurality of frames of screen images in the original screen video, and determine video encoding parameters for the original screen video according to the image feature parameters. The acquiring unit 1103 is configured to acquire screen display resolution of a screen sharing object. The encoding unit is configured to encode the original screen video according to the video encoding parameters and with reference to the screen display resolution of the screen sharing object.

In an example embodiment of the disclosure, based on the foregoing solution, the reading unit 1102 is configured to: read the image feature parameters of the plurality of frames of screen images in the original screen video, specifically including at least one of the following: reading image fingerprint strings of the plurality of frames of screen images in the original screen video; reading image vector eigenvalues of the plurality of frames of screen images in the original screen video; reading image color histograms of the plurality of frames of screen images in the original screen video; reading image pixel grayscale values of the plurality of frames of screen images in the original screen video; and reading image complexities of the plurality of frames of screen images in the original screen video.

In an example embodiment of the disclosure, based on the foregoing solution, the image feature parameters include the image fingerprint strings. The reading unit 1102 includes: a calculating unit, configured to calculate, based on the image fingerprint strings, similarities between adjacent frames of images in the plurality of frames of screen images in the original screen video; and a first determining unit, configured to determine, according to the similarities between the adjacent frames of images, an encoding frame rate for performing video encoding on the original screen video.

In an example embodiment of the disclosure, based on the foregoing solution, the first determining unit is configured to: detect whether the similarities between the adjacent frames of images are greater than a predetermined threshold; and determine the encoding frame rate for performing video encoding on the original screen video as 0, in a case that the similarities between the adjacent frames of images are greater than the predetermined threshold.

In an example embodiment of the disclosure, based on the foregoing solution, the image feature parameters include the image complexities. The reading unit 1102 includes: a second determining unit, configured to determine, based on an image complexity of a current frame of screen image, a QP for performing video encoding on the original screen video.

In an example embodiment of the disclosure, based on the foregoing solution, the second determining unit is configured to: detect whether the image complexity of the current frame of screen image is greater or less than an image complexity of a previous frame of screen image; and correspondingly increase or decrease a QP for performing video encoding on the original screen video, in a case that the image complexity of the current frame of screen image is greater or less than the image complexity of the previous frame of screen image.

In an example embodiment of the disclosure, based on the foregoing solution, the acquiring unit 1103 is configured to: acquire video capture resolution of the original screen video before encoding the original screen video. The encoding unit 1104 is configured to: detect whether the video capture resolution is greater than the screen display resolution; and encode the original screen video according to the video encoding parameters by using the screen display resolution as a standard in a case that the video capture resolution is greater than the screen display resolution.

In an example embodiment of the disclosure, based on the foregoing solution, the encoding unit 1104 is configured to: record an encoding time for each frame of screen image in the original screen video during encoding of the original screen video; calculate an average encoding time of first N frames of screen images, where N is an integer greater than 0; determine an encoding mode based on the average encoding time of the first N frames of screen images; and encode the original screen video based on the encoding mode and according to the video encoding parameters.

In an example embodiment of the disclosure, based on the foregoing solution, the encoding unit 1104 is configured to: detect whether the average encoding time of the first N frames of screen images is greater than a predetermined threshold; use hardware encoding as the determined encoding mode, in a case that the average encoding time of the first N frames of screen images is greater than a time threshold; and use software encoding as the determined encoding mode, in a case that the average encoding time of the first N frames of screen images is not greater than the time threshold.

Figure 12:
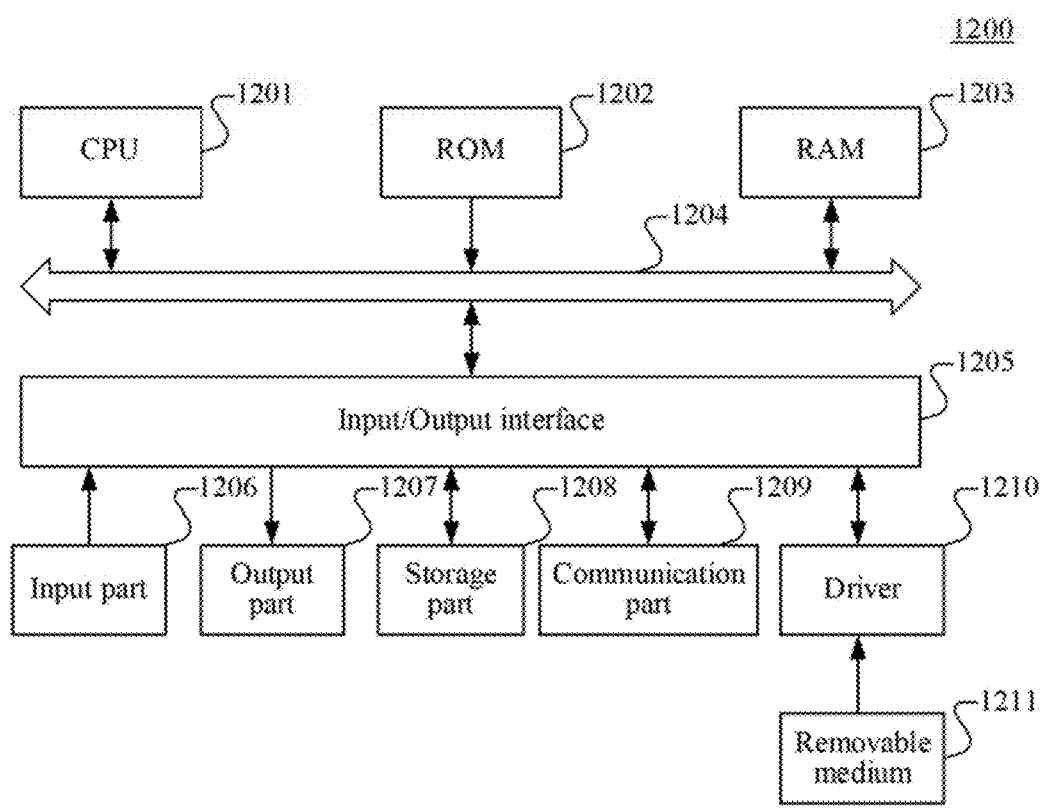
FIG. 12 shows a schematic structural diagram of a computer system suitable for realizing an electronic device according to an example embodiment of the disclosure.

FIG. 12 is a schematic structural diagram of a computer system adapted to implement an electronic device according to an example embodiment of the disclosure.

A computer system 1200 of the electronic device shown in FIG. 12 is merely an example, and does not constitute any limitation on functions and use ranges of the embodiments of the disclosure.

As shown in FIG. 12, the computer system 1200 includes a central processing unit (CPU) 1201, which may perform various suitable actions and processing based on a program stored in a read-only memory (ROM) 1202 or a program loaded from a storage part 1208 into a random access memory (RAM) 1203, for example, perform the method described in the foregoing embodiments. Various programs and data required for system operation are stored in the RAM 1203. The CPU 1201, the ROM 1202, and the RAM 1203 are connected to each other by using a bus 1204. An input/output (I/O) interface 1205 is also connected to the bus 1204.

The following components are connected to the I/O interface 1205: an input part 1206 including a keyboard, a mouse, or the like; an output part 1207 including a cathode ray tube (CRT), a liquid crystal display (LCD), a speaker, or the like; a storage part 1208 including a hard disk, or the like; and a communication part 1209 including a network interface card such as a local area network (LAN) card or a modem. The communication part 1209 performs communication processing by using a network such as the Internet. A driver 1210 is also connected to the I/O interface 1205 as required. A removable medium 1211, such as a magnetic disk, an optical disc, a magneto-optical disc, or a semiconductor memory, is installed on the drive 1210 as required, so that a computer program read from the removable medium is installed into the storage part 1208 as required.

Particularly, according to an embodiment of the disclosure, the processes described in the following with reference to the flowchart may be implemented as a computer software program. For example, the embodiments of the disclosure provides a computer program product, including a computer program loaded on a computer-readable storage medium. The computer program includes program code used for performing the method according to the flowchart. In such an embodiment, by using the communication part 1209, the computer program may be downloaded and installed from a network, and/or installed from the removable medium 1211. When the computer program is executed by the CPU 1201, the various functions defined in the system of the disclosure are executed.

It is to be noted that the computer-readable storage medium shown in the embodiments of the disclosure may be a computer-readable signal medium or a computer-readable storage medium or any combination thereof. The computer-readable storage medium may be, for example, but is not limited to, an electric, magnetic, optical, electromagnetic, infrared, or semi-conductive system, apparatus, or component, or any combination of the above. A more specific example of the computer-readable storage medium may include but is not limited to: an electrical connection having one or more wires, a portable computer magnetic disk, a hard disk, a RAM, a ROM, an erasable programmable read-only memory (EPROM), a flash memory, an optical fiber, a compact disk read-only memory (CD-ROM), an optical storage device, a magnetic storage device, or any appropriate combination thereof. In the disclosure, the computer-readable storage medium may be any tangible medium containing or storing a program, and the program may be used by or used in combination with an instruction execution system, an apparatus, or a device. In the disclosure, a computer-readable signal medium may include a data signal being in a baseband or propagated as a part of a carrier wave, the data signal carrying computer-readable program code. A data signal propagated in such a way may assume a plurality of forms, including, but not limited to, an electromagnetic signal, an optical signal, or any appropriate combination thereof. The computer-readable signal medium may also be any computer-readable storage medium apart from the computer-readable storage medium. The computer-readable storage medium can send, propagate, and transmit a program used by or used in combination with an instruction execution system, an apparatus, or a device. The program code included in the computer-readable storage medium may be transmitted by using any suitable medium, including but not limited to: a wireless medium, a wired medium, or the like, or any suitable combination thereof.

The flowcharts and block diagrams in the accompanying drawings illustrate possible system architectures, functions and operations that may be implemented by a system, a method, and a computer program product according to various embodiments of the disclosure. Each box in a flowchart or a block diagram may represent a module, a program segment, or a part of code. The module, the program segment, or the part of code includes one or more executable instructions used for implementing specified logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. It should also be noted that, each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

A related unit described in the embodiments of the disclosure may be implemented in a software manner, or may be implemented in a hardware manner, and the unit described can also be set in a processor. Names of the units do not constitute a limitation on the units in a specific case.

In another aspect, the disclosure further provides a computer-readable storage medium. The computer-readable storage medium may be included in the electronic device described in the foregoing embodiments, or may exist alone and is not disposed in the electronic device. The computer-readable medium carries one or more programs, the one or more programs, when executed by the electronic device, causing the electronic device to perform the method described in the foregoing embodiments.

Although a plurality of modules or units of a device configured to perform actions are discussed in the foregoing detailed description, such division is not mandatory. Actually, according to the implementations of the disclosure, the features and functions of two or more modules or units described above may be specifically implemented in one module or unit. On the contrary, the features and functions of one module or unit described above may be further divided to be embodied by a plurality of modules or units.

According to the foregoing descriptions of the example embodiments, a person skilled in the art may readily understand that the exemplary implementations described herein may be implemented by using software, or may be implemented by combining software and necessary hardware. Therefore, the technical solutions of the embodiments of the disclosure may be implemented in a form of a software product. The software product may be stored in a non-volatile storage medium (which may be a CD-ROM, a universal serial bus (USB) flash drive, a removable hard disk, or the like) or on the network, including several instructions for instructing a computing device (which may be a personal computer, a server, a touch terminal, a network device, or the like) to perform the methods according to the embodiments of the disclosure.

After considering the specification and practicing the implementations of the present disclosure, a person skilled in the art may easily conceive of other implementations of the disclosure. The disclosure is intended to cover any variations, uses, or adaptive changes of the disclosure. These variations, uses, or adaptive changes follow the general principles of the disclosure and include common general knowledge or common technical means in the art, which are not disclosed in the disclosure.

It is to be understood that the disclosure is not limited to the precise structures described above and shown in the accompanying drawings, and various modifications and changes can be made without departing from the scope of the disclosure. The scope of the disclosure is subject only to the appended claims.

What is claimed is:

1. An encoding method for screen sharing, performed by an electronic device, the method comprising:
   capturing an original screen video to be encoded, the original screen video comprising a plurality of frames of screen images;

reading image feature parameters of the plurality of frames of screen images in the original screen video, the image feature parameters comprising image fingerprint strings;

determining video encoding parameters for the original screen video according to the image feature parameters;

acquiring screen display resolution of a screen sharing object; and encoding the original screen video according to the video encoding parameters and with reference to the screen display resolution of the screen sharing object, wherein determining the video encoding parameters comprises:

calculating, based on the image fingerprint strings, similarities between adjacent frames of images in the plurality of frames of screen images in the original screen video, determining an encoding frame rate for performing video encoding on the original screen video, based on an inversely proportional relationship between the encoding frame rate for performing video encoding on the original screen video and the similarities between the adjacent frames of images, the inversely proportional relationship being a relationship in which a frame rate for performing video encoding increases as a degree of similarity between adjacent frames of images decreases, determining whether an image complexity of a current frame from among the plurality of frames is greater than or less than an image complexity of a previous frame from among the plurality of frames, and increasing a quantization parameter of the video encoding parameters based on determining that the image complexity of the current frame is less than the image complexity of the previous frame, or decreasing the quantization parameter of the video encoding parameters based on determining that the image complexity of the current frame is greater than the image complexity of the previous frame.

2. The method according to claim 1, further comprising:
determining, when the similarities between the adjacent frames of images are greater than a predetermined threshold, the encoding frame rate as 0.

3. The method according to claim 1, wherein, before the encoding the original screen video, the method further comprises:

acquiring video capture resolution of the original screen video; and the encoding the original screen video according to the video encoding parameters and with reference to the screen display resolution of the screen sharing object comprises:

detecting whether the video capture resolution is greater than the screen display resolution; and encoding the original screen video according to the video encoding parameters by using the screen display resolution as a standard in a case that the video capture resolution is greater than the screen display resolution.

4. The method according to claim 1, wherein the encoding comprises:

recording, during encoding of the original screen video, an encoding time for each frame of screen image in the original screen video;

calculating an average encoding time of first N frames of screen images, wherein N is an integer greater than 0;

determining an encoding mode based on the average encoding time of the first N frames of screen images; and encoding the original screen video based on the encoding mode and according to the video encoding parameters.

5. The method according to claim 4, wherein the determining comprises:

detecting whether the average encoding time of the first N frames of screen images is greater than a time threshold;

using hardware encoding as the determined encoding mode in a case that the average encoding time of the first N frames of screen images is greater than the time threshold; and using software encoding as the determined encoding mode in a case that the average encoding time of the first N frames of screen images is not greater than the time threshold.

6. An encoding apparatus for screen sharing, comprising:
at least one memory configured to store computer program code;

at least one processor configured to operate as instructed by the computer program code, the computer program code including:

capturing code configured to cause the at least one processor to capture an original screen video to be encoded, the original screen video comprising a plurality of frames of screen images;

reading code configured to cause the at least one processor to read image feature parameters of the plurality of frames of screen images in the original screen video, the image feature parameters comprising image fingerprint strings;

first determining code configured to cause the at least one processor to determine video encoding parameters for the original screen video according to the image feature parameters;

acquiring code configured to cause the at least one processor to acquire screen display resolution of a screen sharing object; and encoding code configured to cause the at least one processor to encode the original screen video according to the video encoding parameters and with reference to the screen display resolution of the screen sharing object, wherein the first determining code is further configured to cause the at least one processor to:

calculate, based on the image fingerprint strings, similarities between adjacent frames of images in the plurality of frames of screen images in the original screen video;

determine an encoding frame rate for performing video encoding on the original screen video, based on an inversely proportional relationship between the encoding frame rate for performing video encoding on the original screen video and the similarities between the adjacent frames of images the inversely proportional relationship being a relationship in which a frame rate for performing video encoding increases as a degree of similarity between adjacent frames of images decreases;

determine whether an image complexity of a current frame from among the plurality of frames is greater than or less than an image complexity of a previous frame from among the plurality of frames;

increase a quantization parameter of the video encoding parameters based on determining that the image complexity of the current frame is less than the image complexity of the previous frame; and decrease the quantization parameter of the video encoding parameters based on determining that the image complexity of the current frame is greater than image complexity of the previous frame.

7. The apparatus according to claim 6, wherein the second determining code is further configured to cause the at least processor to:

determine, when the similarities between the adjacent frames of images are greater than a predetermined threshold the encoding frame rate as 0.

8. The apparatus according to claim 6, wherein, before the encoding the original screen video, the apparatus further comprises:

acquiring video capture resolution of the original screen video; and the encoding code is further configured to cause the at least one processor to:

detect whether the video capture resolution is greater than the screen display resolution; and encode the original screen video according to the video encoding parameters by using the screen display resolution as a standard in a case that the video capture resolution is greater than the screen display resolution.

9. The apparatus according to claim 6, wherein the encoding code is further comprises:

recording code configured to cause that at least one processor to record, during encoding of the original screen video, an encoding time for each frame of screen image in the original screen video;

calculating code configured to cause the at least one processor to calculate an average encoding time of first N frames of screen images, wherein N is an integer greater than 0;

fourth determining code configured to cause the at least one processor to determine an encoding mode based on the average encoding time of the first N frames of screen images; and second encoding code configured to cause the at least one processor to encode the original screen video based on the encoding mode and according to the video encoding parameters.

10. The apparatus according to claim 9, wherein the fourth determining code is configured to cause the at least one processor to:

detect whether the average encoding time of the first N frames of screen images is greater than a time threshold;

use hardware encoding as the determined encoding mode in a case that the average encoding time of the first N frames of screen images is greater than the time threshold; and use software encoding as the determined encoding mode in a case that the average encoding time of the first N frames of screen images is not greater than the time threshold.

11. A non-transitory computer-readable memory storage medium, storing a computer code that when executed by at least one processor causes the at least one processor to:

capture an original screen video to be encoded, the original screen video comprising a plurality of frames of screen images;

read image feature parameters of the plurality of frames of screen images in the original screen video, the image feature parameters comprising image fingerprint strings;

determine video encoding parameters for the original screen video according to the image feature parameters;

acquire screen display resolution of a screen sharing object; and encode the original screen video according to the video encoding parameters and with reference to the screen display resolution of the screen sharing object, wherein the determine the video encoding parameters comprises:

calculating, based on the image fingerprint strings, similarities between adjacent frames of images in the plurality of frames of screen images in the original screen video;

determining an encoding frame rate for performing video encoding on the original screen video, based on an inversely proportional relationship between the encoding frame rate for performing video encoding on the original screen video and the similarities between the adjacent frames of images, the inversely proportional relationship being a relationship in which a frame rate for performing video encoding increases as a degree of similarity between adjacent frames of images decreases;

determining whether an image complexity of a current frame from among the plurality of frames is greater than or less than an image complexity of a previous frame from among the plurality of frames;

increasing a quantization parameter of the video encoding parameters based on determining that the image complexity of the current frame is less than the image complexity of the previous frame, or decreasing the quantization parameter of the video encoding parameters based on determining that the image complexity of the current frame is greater than the image complexity of the previous frame.

* * * * *